(12) United States Patent
Compoint et al.

(10) Patent No.: US 11,701,865 B2
(45) Date of Patent: Jul. 18, 2023

(54) LAMINATED GLAZING REFLECTING INFRARED

(71) Applicant: SAINT-GOBAIN GLASS FRANCE, Courbevoie (FR)

(72) Inventors: François Compoint, Paris (FR); Antoine Diguet, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/442,948

(22) PCT Filed: Mar. 19, 2020

(86) PCT No.: PCT/EP2020/057608
§ 371 (c)(1),
(2) Date: Sep. 24, 2021

(87) PCT Pub. No.: WO2020/193363
PCT Pub. Date: Oct. 1, 2020

(65) Prior Publication Data
US 2022/0184929 A1  Jun. 16, 2022

(30) Foreign Application Priority Data

Mar. 27, 2019  (FR) ...................................... 1903180

(51) Int. Cl.
*B32B 17/10* (2006.01)
(52) U.S. Cl.
CPC .... *B32B 17/10036* (2013.01); *B32B 17/1011* (2013.01); *B32B 17/1077* (2013.01);
(Continued)
(58) Field of Classification Search
CPC ...... B32B 17/00–17/1099; G02B 5/281–5/282
See application file for complete search history.

(56) References Cited

U.S. PATENT DOCUMENTS

| | | | |
|---|---|---|---|
| 5,986,797 A | 11/1999 | Lynam | |
| 6,910,729 B2 | 6/2005 | Kraenzler et al. | |
| 2011/0300356 A1 | 12/2011 | Takamatsu et al. | |
| 2012/0250146 A1 | 10/2012 | Tamai et al. | |
| 2017/0276846 A1* | 9/2017 | Ishido | C09B 67/0083 |
| 2018/0361714 A1* | 12/2018 | Kim | B32B 17/10688 |

FOREIGN PATENT DOCUMENTS

| | | |
|---|---|---|
| EP | 0 687 554 A1 | 12/1995 |
| EP | 1 060 876 A2 | 12/2000 |

(Continued)

OTHER PUBLICATIONS

Lu, Jun. "New Interlayers for Higher Security Automotive Glazing", SAE Transactions, vol. 111, Section 5: Journal of Materials and Manufacturing (2002); pp. 811-816.*

(Continued)

*Primary Examiner* — Prashant J Khatri
(74) *Attorney, Agent, or Firm* — Pillsbury Winthrop Shaw Pittman LLP (57) ABSTRACT

A laminated glazing includes an outer sheet of clear glass and an inner sheet of clear glass, which are joined to one another by an interlayer of plastic, includes the succession of the following elements, from the inside to the outside of the glazing: the inner sheet of clear glass, a stack of layers reflecting infrared radiation between 780 nm and 2500 nm, the interlayer including successively a) a first thin sheet including a layer of a polymer compound or of a varnish, the polymer compound or the varnish including a dye, the dye absorbing substantially all of the light within the visible region and being substantially transparent to the infrared, b) a second thin sheet of an untinted plastic, the outer sheet of clear glass.

20 Claims, 2 Drawing Sheets

(52) U.S. Cl.
CPC .. *B32B 17/10229* (2013.01); *B32B 17/10633* (2013.01); *B32B 17/10651* (2013.01); *B32B 17/10743* (2013.01); *B32B 17/10761* (2013.01); *B32B 17/10788* (2013.01); *B32B 17/10871* (2013.01); *B32B 17/10972* (2013.01); *B32B 2307/4026* (2013.01); *B32B 2307/732* (2013.01); *B32B 2605/006* (2013.01)

(56) References Cited

FOREIGN PATENT DOCUMENTS

| | | |
|---|---|---|
| EP | 2 090 428 A1 | 8/2009 |
| WO | WO 2005/051858 A1 | 6/2005 |
| WO | WO 2006/108980 A2 | 10/2006 |
| WO | WO 2013/107983 A1 | 7/2013 |
| WO | WO 2018/015312 A1 | 1/2018 |
| WO | WO 2018/115768 A1 | 6/2018 |
| WO | WO 2018/178547 A1 | 10/2018 |
| WO | WO 2018/178559 A1 | 10/2018 |

OTHER PUBLICATIONS

Finley, J.J. "Heat treatment and bending of low-E glass", Thin Solid Films 351 (1999); pp. 264-273.*
First Office Action as issued in Chinese Patent Application No. 202080001366.4, dated Jul. 1, 2022.
International Search Report as issued in International Patent Application No. PCT/EP2020/057608, dated Jul. 21, 2020.

* cited by examiner

LAMINATED GLAZING REFLECTING INFRARED

CROSS-REFERENCE TO RELATED APPLICATIONS

This application is the U.S. National Stage of PCT/EP2020/057608, filed Mar. 19, 2020, which in turn claims priority to French patent application number 1903180 filed Mar. 27, 2019. The content of these applications are incorporated herein by reference in their entireties.

The invention relates to laminated glazing notably for use as a car sunroof.

Laminated glass glazings are widely used in vehicles, or even in buildings primarily for safety reasons: this structure in fact guarantees elimination of the risk of injuries caused by flying glass splinters if it is destroyed or damaged.

Such glazing must also:

on the one hand, not allow all of the incident solar radiation to pass through, to avoid excessive heating of the interior of the vehicle and/or limit the energy consumption (due for example to excessive use of the air conditioning on account of the amount of heat entering the passenger compartment), but on the other hand allow a sufficient amount of light to pass through to light the interior sufficiently and thus maintain visual comfort and a feeling of comfort.

Meeting these two requirements, namely preventing excessive entry of high-energy radiation and lighting the interior sufficiently, necessarily involves a compromise. There is therefore a demand for laminated glazing having the best compromise in terms of reflection of thermal energy while maintaining a certain transparency to light.

To evaluate the transmission of heat through laminated glazing, the total solar transmittance (TTS) is often measured according to standard ISO 13837 with the convention "A" AM 1.5. To evaluate light transmission through the glazing in the visible region (380-780 nm), we may for example use the light transmission $T_L$ as measured according to standard NF EN-410.

To achieve the compromise described above, several configurations of laminated structures have already been described.

According to a first possibility, the use of tinted glass is known, which absorbs part of the radiation and filters out a major portion of the spectrum of the incident radiation, without distinguishing between the different parts of the solar spectrum (UV—Visible—Near IR). For example, the publication WO 2006/108980A2 describes such glazing for motor vehicle roofs. According to this model, a light transmission $T_L$ of the order of 10% is maintained for a TTS of the order of 30%.

According to other possible configurations, it is proposed to use a tinted interlayer binding the two glass sheets, also optionally tinted, notably a tinted thin sheet of PVB (polyvinyl butyral). We may also for example refer to the publication EP0687554A1 for an example of a configuration of this kind.

The specification of U.S. Pat. No. 6,910,729 describes, as an alternative, a glazing with a thermal comfort effect combining an electrochromic glass with a low-emissivity layer disposed on the surface facing the vehicle's interior.

Patent application EP 1060876 A2 describes, according to another solution, laminated glazing consisting of an outer glass sheet, a solar protection stack comprising two layers of silver disposed on face 2 (the faces being numbered from outer to inner), a thin sheet of clear PVB, a thin sheet of tinted PVB, and an inner glass sheet, on which a low-emissivity layer of fluorine-doped tin oxide is deposited. However, the use of stacks reflecting the near infrared (i.e. between 780 and 2500 nm), notably those comprising several layers based on silver, gives a very pronounced tint to the resultant glazing viewed from outside, in particular a reddish appearance in reflection for viewing angles far from the normal to the surface of the glazing—a coloration that is considered unsightly and undesirable in this sector.

Moreover, various other combinations of the preceding systems (tinted PVB and/or glass) have been proposed. Thus, in the end, values of the light transmission $T_L$ of the order of 8 to 20% are generally obtained for a TTS factor of the order of 20 to 35%.

Although such values give overall satisfaction, the solutions proposed to date are expensive to implement and the price of the final glazing is relatively high, notably because of the high price of bulk-tinted glass and/or bulk-tinted PVB (or other interlayer). "Bulk-tinted" means that the dye is introduced during a step in the manufacture of the product (glass or PVB) so as to be distributed homogeneously throughout the volume of said product, in contrast to clear glass or clear PVB, which in principle does not contain said dyes.

The problem on which the invention is based is therefore to propose a laminated glass that is easy and economical to manufacture, which can in particular serve as a car roof, which makes it possible to achieve the compromise that is required between TTS and $T_L$, in particular a light transmission in the visible $T_L$ between 8 and 20% and a TTS factor between 20 and 35%, preferably of relatively neutral color in outward appearance and more preferably in interior appearance, regardless of the viewing angle, and which does not comprise bulk-tinted glass or bulk-tinted PVB.

More particularly, the aforementioned technical problem is solved with the laminated glazing according to the invention.

Said glazing has the following features: It comprises an outer sheet of clear glass and an inner sheet of clear glass which are bonded to one another by means of an interlayer. It comprises the succession of the following elements, from the inside to the outside of said glazing:

said inner sheet of clear glass,
a stack of layers reflecting infrared radiation between 780 nm and 2500 nm,
the interlayer comprising:
  a) a first thin sheet comprising or consisting of a layer of a polymer compound or of a varnish, said polymer compound or said varnish comprising a dye, said dye absorbing substantially all of the light within the visible region between 380 and 780 nm and being substantially transparent to infrared radiation, notably to near infrared radiation and in particular to infrared radiation with a wavelength between 800 and 2000 nm,
  b) a second thin sheet of a clear plastic (i.e. not bulk-tinted), preferably a thermoplastic, notably clear PVB,
said outer sheet of clear glass.

Additional and advantageous features of said laminated glazing are given below and may of course be combined with one another if applicable:

Said dye has, as measured with a Perkin-Elmer lambda 900 spectrophotometer, an absorption spectrum between 380 and 2000 nm, at a concentration of 0.5 wt % in a layer with a thickness of at least 10 micrometers, for example 0.25 millimeters, of said polymer compound or of said varnish, an averaged absorbance between 800 and 2000 nm at least 5 times lower than the averaged absorbance between 380 and 780 nm and preferably at least 7 times lower, or even at least 10 times lower.

Said dye is black or substantially black.

Said dye has, in the matrix of said polymer compound and at 25° C., an average molar extinction coefficient (or molar absorptivity) between 780 nm and 2000 nm at least 5 times less than the average molar extinction coefficient between 380 nm and 780 nm and preferably at least 7 times lower or even at least 10 times lower. As is well known, the molar extinction coefficient, also called molar absorptivity or molar absorption coefficient, characterizes the ability of a composition to absorb light. The Beer-Lambert law stipulates that it does not depend on the concentration of the composition or the thickness traversed by the light, but on the nature of the solute (dye, in this case) and solvent (matrix, in this case), the wavelength of the incident light and the temperature. An "average" molar extinction coefficient thus corresponds in the sense of the present invention to the average of said coefficients, as measured over the wavelength range considered.

The stack of layers reflecting infrared radiation is a stack comprising at least two functional layers based on silver separated by layers of dielectric materials, in particular oxides or nitrides.

The polymer compound of the first thin sheet is selected from monomers, oligomers, or polymers comprising at least one methacrylate function, epoxides, varnishes comprising or consisting of dispersed particles of PVB, latex, polyurethane or acrylate, said dispersion notably being obtained in a suitable solvent (polar or nonpolar).

the thickness of the first thin sheet is between 1 and 250 micrometers, preferably between 5 and 100 micrometers and very preferably between 7 and 50 micrometers.

The dye is selected from Sudan Black B® ((2,2-dimethyl-1,3-dihydroperimidin-6-yl)-(4-phenylazo-1-naphthyl) diazene, $C_{29}H_{24}N_6$, CAS 4197-25-5) or Nigrosine Solvent black 5 (CAS 11099-03-9), and is preferably Sudan Black B®.

The dye represents between 0.1 and 10 wt % of the first thin sheet, preferably between 0.2 and 3 wt % of the first thin sheet.

The second thin sheet of undyed plastic is of polyvinyl butyral (PVB), ethylene/vinyl acetate copolymers (EVA), polyurethane (PU) or of polyvinyl chloride (PVC), and is preferably PVB.

Alternatively, the second thin sheet consists of two sheets of polyvinyl butyral with a sheet of poly(ethylene terephthalate) disposed between them.

The glass sheets have a thickness between 0.7 mm and 5 mm and preferably between 1.6 mm and 3.1 mm.

The stack of layers is a system of thin layers with thicknesses between 0.5 and 100 nm, which comprises one or more layers based on silver, preferably which comprises at least two layers based on silver.

The interlayer comprises successively, with reference to the inner glass sheet: said first thin sheet comprising or consisting of a layer of a polymer compound or of a varnish, then said polymer compound or said varnish comprising a dye, and then said second thin sheet of a plastic that is not bulk-tinted.

The interlayer comprises successively, with reference to the inner glass sheet: said second thin sheet of a plastic that is not bulk-tinted, then said first thin sheet comprising or consisting of a layer of a polymer compound or of a varnish, and then said polymer compound or said varnish comprising a dye.

The invention also relates to the use of laminated glazing as described above as a roof, side window, or back window of motor vehicles.

Moreover, the invention relates to a method of manufacturing laminated glazing as described above, comprising at least one first glass sheet and one second glass sheet, the two sheets being bonded together by a thermoplastic interlayer, characterized in that it comprises the following steps:

depositing a stack of layers reflecting infrared radiation between 780 nm and 2500 nm on an inner face of the first glass sheet, depositing, on said stack, a polymer layer or a varnish comprising a dye, said dye absorbing substantially all of the light within the visible region and being substantially transparent to the infrared, drying and/or optionally hardening the polymer layer or varnish comprising the dye, assembling the glass sheet covered with the stack of layers and the colored polymer layer with an undyed transparent thermoplastic interlayer, in particular an undyed PVB, and with the second glass sheet, in such a way that the colored polymer layer is in direct contact with said interlayer, degassing, during which the air trapped between the glass sheets and the thermoplastic interlayer is eliminated, and heat treating the laminated glass under pressure and/or under vacuum at a temperature between 100 and 200° C., during which assembly of the laminated glazing is effected.

Figure 1:
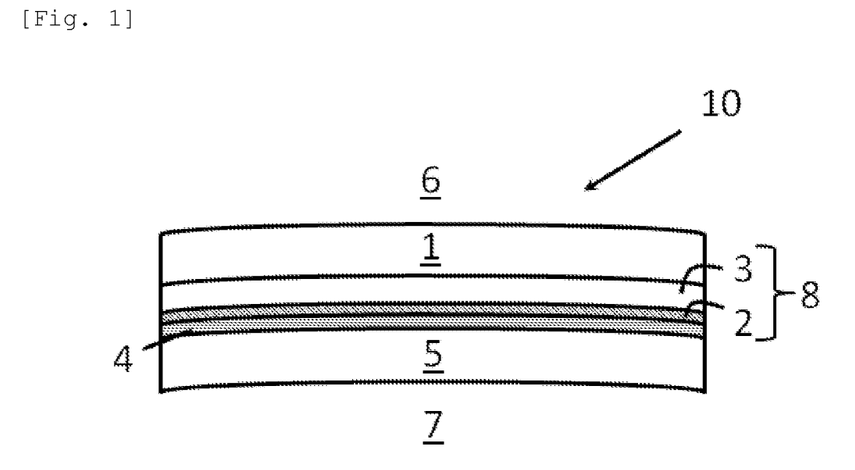
FIG. 1 shows a cross-sectional view of a glazing according to an embodiment of the invention.

As a nonlimiting example and for better understanding of the present invention, the appended FIG. 1 shows a cross-sectional view of an embodiment of glazing according to the invention.

This embodiment is particularly suitable for making a glazed roof structure for an automobile but could also be used as a back window, or even as side glazing.

The laminated glazing 10 according to the invention comprises two clear glass sheets 1 and 5, i.e. not bulk-tinted. In particular, said glazings are glasses obtained conventionally by a float process. Untinted glasses of this kind may notably have a light transmission $T_L$ of at least 88%, and most often of the order of 90%.

The glazing separates the interior space 7 from the exterior 6 of the vehicle and may be convex.

The individual glass sheets 1 and 5 of the laminated glazing according to the invention are made of glass. Together with the interlayer 8 that bonds them together, they form the laminated structure. The panes preferably have a thickness between 1 mm and 5 mm. For weight saving purposes, the glass sheets must make it possible to reach as good a compromise as possible between small thickness and a high level of safety, especially when the laminated glazing is mounted in an automobile. This compromise may notably be obtained with glass sheets whose thickness is between 1.5 mm and 3.1 mm.

According to the invention, a stack 4 of layers selectively reflecting the infrared is deposited on the inner glass sheet 5. Such stacks are well known and in particular comprise a combination of layers based on precious metals, in particular based on silver and dielectric materials, often called interference layers. In a known manner, these stacks consist of a succession of layers of dielectric materials such as oxides and/or nitrides and metallic layers including layers based on silver whose so-called "low-emissivity" properties make it possible to reflect the so-called near or solar infrared (with a wavelength between 780 nm and 2000 nm) selectively and allow at least part and preferably more than 70%, or even more than 80% of the visible light of the solar spectrum (with a wavelength between 380 and 780 nm) to pass through, notably by minimizing the reflection of light by means of said interference layers or combination(s) of interference layers. Furthermore, the presence of a stack of this kind on the inner face of the inner sheet allows heat to be retained in the passenger compartment in winter.

The stacks according to the invention are notably selected in such a way that their sheet resistance is less than 1.5 ohm per square, more preferably less than 1.2 ohm per square, or even less than 1.1 ohm per square. The sheet resistance may for example be measured using an instrument of type SRM-14T from Nagy Mess-systems.

These stacks may comprise up to several tens of layers whose thickness is of the order of 1 to 30 nm and are at present deposited by the techniques called cathode sputtering, often magnetron-assisted.

The preferred stacks according to the invention comprise two, and preferably three or even four layers based on silver.

Examples of said stacks are notably described in the publications WO2005/051858A1 or WO2013/107983.

The inner glass sheet 5 provided with the stack 4 is then bonded firmly to the glass sheet by the interlayer 8.

The interlayer 8 is a composite that comprises at least one intermediate thin sheet 3 of clear plastic (i.e. to which no dye has been added for tinting it, i.e. to change its color or the amount of light passing through). This intermediate thin sheet is, in a known manner, melted in an autoclave between the two glass sheets to bond them together. Polyvinyl butyral (PVB), which may optionally be acoustic, was found to be the most suitable material for producing said intermediate thin sheet 3, and is used in most cases in thicknesses of 0.38 mm or 0.76 mm.

Instead of PVB, according to the invention it is also possible to use all the other known materials for constituting an intermediate thin sheet melted between two glass sheets, for example thermoplastics such as ethylene/vinyl acetate copolymers (EVA), polyurethane (PU) or polyvinyl chloride (PVC).

Alternatively, but less preferably, the thin sheet of PVB may be replaced with a thin sheet consisting of a system of layers comprising for example a supporting layer of poly (ethylene terephthalate) (PET) incorporated between two layers of PVB. In this way, a three-layer thin sheet is obtained for joining together the individual glasses 1, 5 in the laminated structure 10.

According to the invention, the interlayer 8 further comprises, underneath the clear thin sheet 3 of PVB used conventionally in industry, i.e. between the stack of layers 4 and said intermediate thin sheet 3, an additional layer or thin sheet 2 comprising a dye.

FIG. 1 shows an interlayer comprising successively, from the interior 7 to the exterior 6, the layer or thin sheet 2 and then the thin sheet 3. However, we would still be within the scope of the invention if we reversed the order of succession of these two thin sheets, although this configuration is less preferred.

This additional layer 2 may advantageously consist of a layer of a polymer compound. Such a polymer may notably be of the type described in the publications WO2018/178559, WO2018/178547 or WO2018/115768, in particular may be or may comprise a polymer of the (meth)acrylate or epoxide type.

According to the invention, the polymer layer 2 may advantageously be obtained from a liquid composition comprising (meth)acrylate compounds selected from monomers, oligomers, or polymers comprising at least one methacrylate function. For example, the liquid composition comprises at least one aliphatic urethane-acrylic oligomer, at least one mono-, bi- or trifunctional (meth)acrylate monomer, at least one polymerization initiator and the dye.

According to a possible embodiment, the liquid composition comprises, in percentage by weight relative to the total weight of the (meth)acrylate compounds, from 30 to 80 wt % of at least one aliphatic urethane-acrylic oligomer and from 20 to 70 wt % of at least one mono- or bifunctional (meth)acrylate monomer.

Advantageously, the dye is present at the rate of an amount between 0.01% and 10 wt % relative to the total weight of the polymer compounds present in the layer of polymer compound. The polymer layer 2 may further comprise an adhesion promoter.

The polymer layer 2 may be deposited on the stack of layers 4 by room-temperature application of the liquid composition described above, by roller coating, by sprinkling, by dipping, by curtain coating or by spraying.

The polymer layer 2 is then advantageously hardened by drying at a temperature below 200° C., by UV crosslinking, or by electron beam.

The thickness of the hardened polymer layer 2 may be between 1 and 250 micrometers, typically between 5 and 50 micrometers.

According to a possible embodiment, the surface of the stack of layers on which the colored polymer layer is deposited and/or the surface of the face of the thermoplastic interlayer in contact with the polymer layer may be treated beforehand with an adhesion promoter.

Said polymer serves as a matrix for a dye (or colorant) specifically selected for its qualities of absorption of light in the visible region (380-780 nm) but also substantially transparent to the near infrared, notably between 780 and 2000 nm, in the sense described below. For example, the dyes of the Sudan type may advantageously be selected, and in particular the dye Sudan Black B, whose structural formula is given below:

Of course, the present invention is not limited to a compound of this kind and any dye having, in its plastic matrix, a low coefficient of absorption of infrared between 780 nm and 2000 nm may be used according to the invention and a high coefficient of absorption in the visible region may be used. The dye used is therefore in principle black, but dyes may also be used that do not absorb all of the visible light but at least 80% or even at least 90% of the latter, and which then has a slight coloration, although dark.

According to another embodiment, the polymer layer 2 comprising the dye may be deposited on the inner glass sheet 5 provided with the stack 4 in the form of a varnish based on said dye. Such a varnish consists for example of a liquid solution of dispersed particles of PVB, latex, polyurethane or acrylate in a suitable solvent (polar or nonpolar), i.e. allowing dissolution of the dye for deposition thereof in the form of a homogeneous layer.

Advantageously, said dye is selected in such a way that it has, in the additional layer 2 in which it is present in the stack and at a concentration of 0.5% of the total weight of said matrix (or varnish) and for a thickness of the layer of at least 5 micrometers and which may be up to 0.25 mm, preferably between 10 and 40 micrometers, a ratio of its integrated absorbance between 380 and 780 nm to its integrated absorbance between 780 nm and 2000 nm greater than 5, preferably greater than 7, or even greater than 10. According to another possible embodiment of selection of the dye, the latter may have, in the matrix of said polymer compound and at 25° C., an average molar extinction coefficient between 780 nm and 2000 nm at least 5 times lower than the average molar extinction coefficient between 380 nm and 780 nm, and preferably at least 7 times lower, or even at least 10 times lower.

The laminated structure 10 finally comprises another outer glass sheet of clear glass 1, which overlies the interlayer 8, preferably in direct contact with the thin sheet 3, and which completes the laminated structure.

The laminated glazings according to the invention preferably have, in the L, a*, b* international colorimetry system:
- in transmission: values of L below 60, or even below 55 and values of a* and b* whose absolute value is below 5 and is preferably below 3. More preferably, said values are negative or very close to zero.
- in external reflection, values of L below 35, or even below 30 and values of a* and b* whose absolute value is below 5 and is preferably below 3. More preferably, said values are negative or very close to zero.
- in internal reflection, values of L below 40, or even below 35 and values of a* and b* whose absolute value is below 5 and is preferably below 3. More preferably, said values are negative or very close to zero.

Thus, a laminated glazing according to the invention advantageously also has a relatively neutral color not only in external reflection but also in internal reflection.

Manufacture of the laminated structure 10 described above and in particular incorporation of the additional layer 2 in the thermoplastic interlayer 8, in combination with a plastic thin sheet 3 (notably of clear PVB) used conventionally for bonding the two glass sheets of laminated glazing, may notably be carried out by a method as described in patent applications WO2018/178559, WO2018/178547 or WO2018/115768, to which reference should be made for more details about the implementation of said manufacture.

More particularly, said method for manufacturing laminated glazing comprises the following steps:

- depositing, by the vacuum cathode sputtering techniques, an infrared-reflective stack 4 as described above, on the inner face of a first inner glass sheet 5,
- optionally forming said glazing, such as bending or tempering,
- liquid deposition, notably by roller coating, by sprinkling, by dipping, by curtain coating or preferably by spraying (spray-coating) on the inner face of said first glass sheet (thin sheet 5 provided with the stack 4), of a polymer layer of plastic 2 comprising the dye or of a varnish comprising the dye,
- drying and optionally hardening the polymer layer 2,
- assembling the glass sheet 5 coated with the colored polymer layer 2 with an undyed transparent thermoplastic interlayer 3, in particular undyed PVB, and with the second glass sheet 1, in such a way that the colored polymer layer is in direct contact with said interlayer,
- degassing, during which the air trapped between the glass sheets and the thermoplastic interlayer 8 is eliminated, and
- heat treating the laminated glass under pressure and/or under vacuum at a temperature between 60 and 200° C.

Used as laminated glazing, notably for application as a glazed roof for automobiles, the glazing according to the invention makes it possible to solve the technical problem described above owing to its particular structure. In particular it allows the following advantages to be combined:

Low cost of the materials included in its composition since it does not contain the most expensive elements present in the existing structures (in particular no PVB initially bulk-dyed, no bulk-dyed glass) and therefore a low manufacturing cost. Furthermore, the operations of liquid deposition usable according to the invention are generally inexpensive owing to a high line speed and the dyes used are commercially available and inexpensive.

A neutral external color of the glazing, particularly at large viewing angles. In fact, the reflected color of the stack of infrared-reflective thin layers is strongly attenuated on passing through the polymer layer comprising the dye.

A neutral internal color of the glazing, even at large viewing angles.

The possibility of adjusting the light transmission of the glazing by adjusting the concentration by weight of dye in the polymer layer to values that may be up to 5% or even 10% of the total weight of said layer.

Optimal solar control properties of the laminated glazing obtained:

a) owing to the presence, on the first glass sheet, of a stack that reflects the solar infrared but allows a major part of the radiation in the visible region to pass through, b) because of the nature and positioning of the dye within the glazing: the incident solar radiation first passes through the layer comprising the dye, in which an adjustable portion of the visible light (between 380 and 780 nm) is absorbed as a function of the concentration of dye. The residual radiation, predominantly comprising the infrared portion of the solar spectrum, is reflected by the stack of layers to the layer comprising the dye. As the dye does not absorb the radiation in the near infrared region, additional heating of the glazing and consequently of the passenger compartment of the vehicle is not observed.

Moreover, the light reflections in the visible region are low, typically less than 15%, or even less than 10%, on both sides of the glazing, making it possible to ensure both a good external aesthetic appearance and an improved interior comfort, notably at night.

The stack of layers is advantageously selected to allow a sufficient amount of light to pass through to light the interior sufficiently and thus maintain visual comfort and a feeling of comfort. Thus, advantageously, a stack of layers may be selected which, when it is deposited on clear glass with a thickness of 2.1 mm, results in glazing having light transmission $T_L$ in the sense described above of at least 50%, or even of at least 60% or even of at least 70%.

An embodiment example of glazing according to the invention is given hereunder:

A—Manufacture of a laminated structure according to the invention:

A specimen A, of a laminated structure as described above in connection with FIG. 1, with dimensions 10×10 cm², is prepared.

Specimen A is obtained as follows:

A stack of layers is deposited by the techniques of magnetron-assisted cathode sputtering on a first clear glass with a thickness of 2.1 mm marketed by the applicant company under the reference Planiclear® ($T_L$ of about 90%, undyed). The stack comprises three layers of silver and is described in example 14 of the publication WO2005051858. Its sheet resistance is 1.0 ohm/square, as measured using a type SRM-14T instrument from Nagy Mess Systems).

A liquid composition comprising an acrylate oligomer of the Sartomer CN9002 type (bifunctional aliphatic urethane-acrylate oligomer) and SR 410 monomer (monofunctional aromatic acrylic monomer), prepared at a 50/50 weight ratio, is deposited on this first clear glass. A dye of the Black Sudan B type is added to the acrylate formulation at the rate of a proportion of 0.5 wt % relative to the total weight of the initial composition as well as an amount of a Speedcure 73 photoinitiator equal to 2 wt % of the mixture obtained, is added to induce polymerization.

The liquid composition thus obtained is deposited with a Mayer bar on the glass substrate covered with the stack and above the latter to obtain a wet layer with a thickness of about 20 micrometers. The layer thus obtained is hardened by UV irradiation (UVB dose of about 280 mJ/cm², travel speed of 16 m/min). The thickness of the dry colored layer is about 10-15 μm.

A thin sheet of clear PVB with a thickness of 0.76 mm, marketed under the reference Saflex RK11 ® by the Eastman company, is placed on the first glass sheet coated with the colored layer and a second clear glass sheet identical to the first is affixed to the interlayer so as to close the laminated glazing. The assembly is autoclaved for 30 minutes, at 130° C. at a pressure of 12 bar. In the course of this autoclaving step, we may optionally observe diffusion of the dye inside the PVB, which tends to homogenize the surface density of the dye.

B—Characterization of the laminated structure according to the invention:

The optical characterizations of the glazing as described above are carried out with a Lambda900 spectrophotometer from the company Perkin Elmer.

Figure 3:
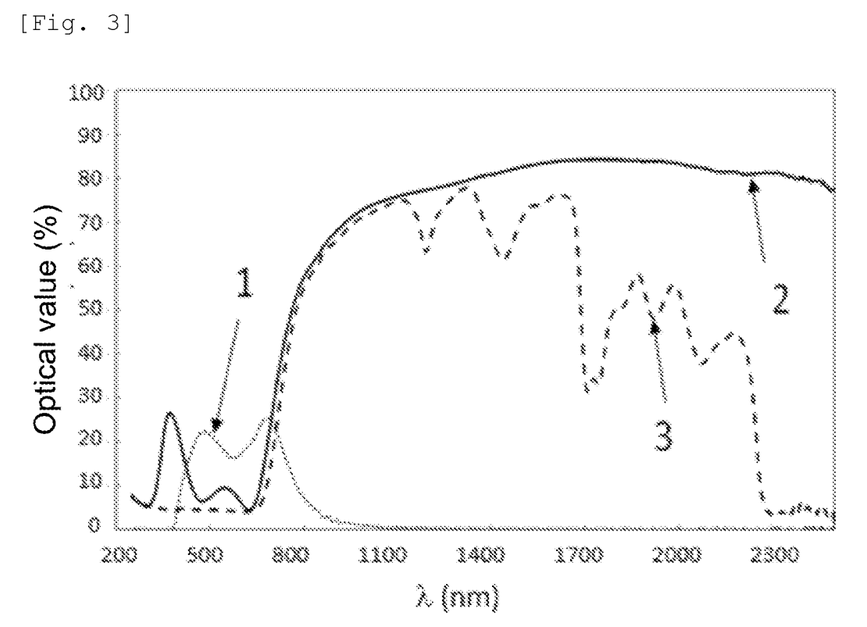
FIG. 3 shows the spectra of transmission (curve 1) and of reflection of the laminated glazing obtained according to an example. The reflection spectra are measured both on the outer face of the glazing (external glass side, curve 3) and on the inner face of the glazing (internal glass side, curve 2).

The accompanying FIG. 3 shows the spectra of transmission (curve 1) and of reflection of the laminated glazing obtained according to the preceding example. The reflection spectra are measured both on the outer face of the glazing (external glass side, curve 3) and on the inner face of the glazing (internal glass side, curve 2).

It can be seen that the reflection of the near infrared lengths, in the wavelength region between 650 and 900 nm, is almost identical whatever face of the glazing is measured (inner or outer). This characteristic illustrates absence of absorption of the Black Sudan B dye used in the near infrared region.

Furthermore, reflection of visible light on the outer face is low ($R_L$<10%). Moreover, the color observed with the naked eye is not very pronounced and is substantially neutral.

Table 1 below gives the main colorimetry data of the laminated glazing according to the invention:

TABLE 1

| Value | Transmission | Color in external reflection | Color in internal reflection |
|---|---|---|---|
| L* | 50 | 25 | 34.3 |
| a* | −1.3 | 0.4 | −4.7 |
| b* | −1.8 | −1.2 | −2.6 |

The light transmission $T_L$ is, moreover, reduced efficiently by the colored layer based on acrylate, the $T_L$ integrated from the spectrum in FIG. 3 being measured at 18%. Visually, the laminated glazing obtained looks dark gray in transmission.

The TTS measured according to standard ISO 13837 convention A, AM1.5 from the spectrum in FIG. 3 is 26%, very close to the values obtained for the configurations of the prior art described above and based on the use of PVB and/or of colored glass.

According to the invention, it seems possible for the light transmission and the total energy transmission of the glazing to be reduced further by acting on the concentration of dye, to levels that may be up to TLs of the order of 5% and a TTS of the order of 15%.

Figure 2:
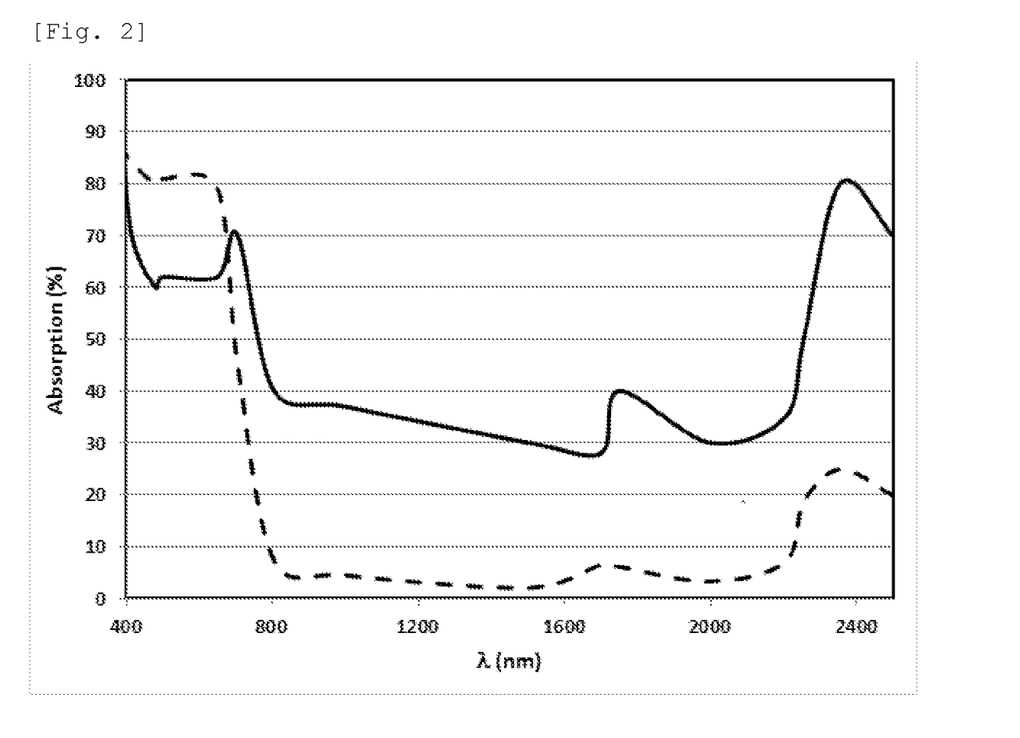
FIG. 2 shows the absorption spectra of a thin sheet of 0.38 mm of bulk-dyed PVB and of a thin sheet of 0.25 mm of an acrylate thin sheet and comprising 0.5 wt% of the dye Black Sudan B.

C—Choice of the dye according to the invention:

FIG. 2 below shows:

the absorption spectrum of a thin sheet of 0.38 mm of bulk-dyed PVB, commercial RB17 (curve shown with solid line), the absorption spectrum of a thin sheet of 0.25 mm of an acrylate thin sheet as described above and comprising 0.5 wt % of the dye Black Sudan B (curve shown with dotted line).

Comparison of the two spectra clearly shows that the thin sheet containing the black dye Sudan B absorbs strongly in the visible region, the dye absorbing almost all of the visible and very little in the near infrared region, notably between 800 and 2000 nm. More particularly, FIG. 2 shows that the average absorption of the acrylate thin sheet between 800 and 2000 nm is lower by a ratio of at least 5, or even of at least 7 or even of at least 10 relative to its average absorption in the visible region (380-780 nm).

In contrast, the thin sheet comprising colored PVB, commercial RB17, absorbs a substantial part of the IR radiation, notably between 800 and 2000 nm.

This property of the thin sheet (or of the layer) comprising the dye and its specific positioning in glazing according to the invention, between the incident solar radiation and the stack of IR-reflective layers, thus makes it possible to prevent heating of the glazing, notably under strong insolation, while preserving its selectivity.

In a preferred embodiment, the laminated glazing according to the invention reflects more than 50%, or even more than 70% of the IR portion of the incident solar radiation to the outside. According to another advantage of the present invention, when viewed from outside, the laminated glazing may have a dark appearance or else a (partial) mirror effect without particular, notable visible and undesirable coloration. In particular, any colored effect of the glazing viewed from the outside is avoided, which is usually due to the presence of the stack of reflective layers in the glazing, which more often has a very colored appearance in reflection. Advantageously, according to the embodiments of the invention, the presence, in the interlayer, of the dye between the stack of layers and the exterior makes it possible to attenuate the initial color resulting from reflection of the solar radiation on the stack, to levels that are imperceptible or barely perceptible to the human eye.

The laminated glazing according to the invention is particularly suitable for use in roof glasses, but also side glasses or rear glasses of vehicles, for example by adapting the concentration of the dye in the interlayer. The laminated glazing gives an enhanced sensation of thermal comfort as well as a certain luminosity inside the vehicle, the enhanced thermal comfort being obtained by means of high selectivity in terms of transmission of light and transmission of energy.

The invention claimed is:

1. A laminated glazing comprising an outer sheet of clear glass and an inner sheet of clear glass, which are bonded to one another by an interlayer, comprising the succession of the following elements, from an inside to an outside of said laminated glazing:
    said inner sheet of clear glass,
    a stack of layers reflecting infrared radiation between 780 nm and 2500 nm,
    said interlayer comprising:
        a) a first thin sheet comprising or consisting of a layer of a polymer compound or of a varnish, said layer of a polymer compound or said varnish comprising a dye, said dye absorbing substantially all of the light within the visible region between 380 and 780 nm and being substantially transparent to infrared radiation, the first thin sheet being arranged over said stack of layers such that solar light that is incident on the laminated glazing passes through the first thin sheet before reaching said stack of layers so that (a) visible light of the solar light is absorbed by the first thin sheet and infrared radiation is allowed to pass through the first thin sheet and is then reflected by said stack of layers back in a direction toward the first thin sheet and (b) a light transmission $T_L$ of the laminated glazing is from 8 to 20% and a solar total transmittance (TTS) of the laminated glazing is from 20 to 35%,
        b) a second thin sheet of a plastic that is not bulk-tinted,
    said outer sheet of clear glass.

2. The laminated glazing as claimed in claim 1, wherein said dye has an absorption spectrum between 380 and 2000 nm, at a concentration of 0.5 wt % in a layer with a thickness of 0.25 millimeters of said polymer compound or of said varnish, an averaged absorbance between 800 and 2000 nm at least 5 times lower than the averaged absorbance between 380 and 780 nm.

3. The laminated glazing as claimed in claim 1, wherein said dye has, in a matrix of said polymer compound and at 25° C., an average molar extinction coefficient between 780 nm and 2000 nm at least 5 times less than the average molar extinction coefficient between 380 nm and 780 nm.

4. The laminated glazing as claimed in claim 1, wherein the stack of layers reflecting infrared radiation is a stack comprising at least two functional layers based on silver separated by layers of dielectric materials.

5. The laminated glazing as claimed in claim 1, wherein the polymer compound of the first thin sheet is selected from monomers, oligomers, or polymers comprising at least one methacrylate function, epoxides, or wherein the varnish comprises dispersed particles of PVB, latex, polyurethane or acrylate.

6. The laminated glazing as claimed in claim 1, wherein the dye is selected from (2,2-dimethyl-1,3-dihydroperimidin-6-yl)-(4-phenylazo-1-naphthyl)diazene (CAS 4197-25-5) or Nigrosine Solvent black 5 (CAS 11099-03-9).

7. The laminated glazing as claimed in claim 1, wherein the dye represents between 0.1 and 10 wt % of the first thin sheet.

8. The laminated glazing as claimed in claim 1, wherein the second thin sheet that is not bulk-tinted is of polyvinyl butyral (PVB), ethylene/vinyl acetate copolymers (EVA), polyurethane (PU) or polyvinyl chloride (PVC).

9. The laminated glazing as claimed in claim 1, wherein the second thin sheet consists of two sheets of polyvinyl butyral with a sheet of poly(ethylene terephthalate) disposed between them.

10. The laminated glazing as claimed in claim 1, wherein the inner and outer sheets of clear glass have a thickness between 0.7 mm and 5 mm.

11. The laminated glazing as claimed in claim 1, wherein the stack of layers is a system of thin layers with thicknesses between 0.5 and 100 nm which comprises one or more layers based on silver.

12. The laminated glazing as claimed in claim 1, wherein the interlayer comprises successively, with reference to the inner sheet of clear glass: said first thin sheet, and then said second thin sheet.

13. The laminated glazing as claimed in claim 1, wherein the interlayer comprises successively, with reference to the inner sheet of clear glass: said second thin sheet, and then said first thin sheet.

14. The laminated glazing as claimed in claim 1, wherein said dye is substantially transparent to wavelength between 800 and 2000 nm.

15. The laminated glazing as claimed in claim 1, wherein the second thin sheet is thermoplastic.

16. The laminated glazing as claimed in claim 1, wherein the second thin sheet is made of clear polyvinyl butyral (PVB).

17. The laminated glazing as claimed in claim 2, wherein the averaged absorbance between 800 and 2000 nm is at least 10 times lower than the averaged absorbance between 380 and 780 nm.

18. The laminated glazing as claimed in claim 3, wherein the average molar extinction coefficient between 780 nm and 2000 nm is at least 10 times less than the average molar extinction coefficient between 380 nm and 780 nm.

19. A method of manufacturing the laminated glazing as claimed in claim 1, comprising at least one first glass sheet and one second glass sheet, the first and second glass sheets being bonded together by a thermoplastic interlayer, the method comprising:
    depositing a stack of layers reflecting infrared radiation between 780 nm and 2500 nm on an inner face of the first glass sheet,
    depositing, on said stack of layers, a layer of a polymer compound or a varnish, said layer of a polymer compound or said varnish comprising a dye, said dye absorbing substantially all of the light within the visible region and being substantially transparent to the infrared, drying and/or optionally hardening the polymer layer or varnish comprising the dye to form a first thin sheet, assembling the first glass sheet covered with the stack of layers and the first thin sheet with a second thin sheet of a plastic that is not bulk-tinted, and with the second glass sheet, degassing, during which air trapped between the first and second glass sheets and the thermoplastic interlayer is eliminated, and heat treating the laminated glazing under pressure and/or under vacuum at a temperature between 100 and 200° C., to form the laminated glazing.

20. A method comprising forming a roof, side window, or back window of a motor vehicle with a laminated glazing as claimed in claim 1.

* * * * *